United States Patent [19]
Erickson

[11] 4,357,153
[45] Nov. 2, 1982

[54] INTERNALLY HEAT PUMPED SINGLE PRESSURE DISTILLATIVE SEPARATIONS

[76] Inventor: Donald C. Erickson, 1704 S. Harbor La., Annapolis, Md. 21401

[21] Appl. No.: 248,884

[22] Filed: Mar. 30, 1981

[51] Int. Cl.³ .............................................. B01D 3/14
[52] U.S. Cl. ........................................ 62/34; 62/39; 203/24; 203/26
[58] Field of Search .................. 62/19, 26, 30, 31, 38, 62/39, 32, 23, 29, 34, 28; 203/24, 26

[56] References Cited
U.S. PATENT DOCUMENTS

| | | | |
|---|---|---|---|
| 2,134,700 | 11/1938 | Brewster | 62/26 |
| 3,756,035 | 9/1973 | Yearout | 62/31 |
| 4,088,464 | 5/1978 | Bigi | 62/29 |

Primary Examiner—Frank Sever

[57] ABSTRACT

This process provides an efficient means for distillative separation of a gas mixture at a temperature below ambient without requiring either a dual pressure or low pressure distillation column. The process comprises supplying the gas at an elevated pressure to a single pressure distillation column, work-expanding the column overhead gas to drive a heat pump compressor, compressing any of several gases in the heat pump compressor so as to effect phase change heat transfer between condensing column reflux and boiling column bottom product, and separately withdrawing the depressurized gaseous separation products.

14 Claims, 3 Drawing Figures

INTERNALLY HEAT PUMPED SINGLE PRESSURE DISTILLATIVE SEPARATIONS

DESCRIPTION

1. Technical Field

Processes in which a mixture of non-condensable gases such as air is separated by partial liquefaction and continuous distillation, and in which the separated components are recontacted in indirect heat exchange downstream of the separator.

2. Background Art

Close boiling non-condensable gases are conventionally separated by continuous distillation, also referred to as fractional distillation or rectification. The distillation is accomplished by establishing multiple stages of contact between an ascending vapor and a descending liquid; each stage provides an additional degree of separation of the more volatile constituents into the vaporous overhead product, and of the less volatile constituents into the liquid bottom product. The ascending vapor is provided by supplying heat to the liquid bottom product so as to boil part of it in a part of the distillation apparatus referred to as the reboiler. The descending liquid is provided by extracting heat from the vaporous overhead product so as to condense part of it in a part of the distillation apparatus referred to as a reflux condenser or simply refluxer. Since the more volatile overhead product has a lower boiling point than the less volatile bottom product, heat must be withdrawn from the refluxer at a lower temperature than heat is supplied to the reboiler. Typically the heat supplied to the reboiler is 10 to 50 times the amount theoretically required for the separation, with the excess being withdrawn at the refluxer. In order to achieve efficient separation, it is essential that the majority of the heat withdrawn at the refluxer be recycled to the reboiler. Since the heat will not spontaneously flow up a temperature gradient, the process must incorporate some mechanism for achieving the desired heat flow from refluxer to reboiler.

The traditional means of accomplishing this in the case of air separation has been the dual pressure column, also referred to as compound column. This column has a lower section which is at a pressure sufficiently higher than the upper section pressure that nitrogen at the higher pressure has a higher boiling point than oxygen at the lower pressure. Thus, the pressure boundary between the two sections becomes the refluxer/reboiler: nitrogen in the lower section condenses at a higher temperature than that at which oxygen boils in the upper section, and hence, the desired flow of heat from refluxer to reboiler spontaneously occurs.

The dual pressure column introduces several problems. The lower pressure section is very large. It must duplicate the rectification already accomplished in the high pressure section. For minimum pressure drop it must be located above the high pressure section. The combined height can be over 60 meters. The large size due to low pressure results in substantial heat leakage. The pressure change due to pressure drop in the low pressure column is severe—on the order of 25% vs. 5% in the high pressure column. The large size drives up the cost, particularly when field erection is required rather than shop fabrication.

Another limitation of the dual pressure column is that it establishes a minimum supply pressure, which is to say energy requirement, which is not related to actual process requirements. The lower column operates as close to ambient as possible such that it will spontaneously exhaust to ambient; the lower column pressure fixes the required upper column pressure. The upper column pressure implies a certain energy availability to the process—that availability is sufficient to accomplish the desired separation and make up for heat leaks at fairly small plant sizes, e.g. 300 TPD. In larger plants the heat leaks are proportionately less, but the supply energy can not be decreased due to the relatively fixed minimum pressure requirement. The extra energy availability is accordingly consumed in making products purer than necessary, including argon, or in providing part of the product as liquid, or simply wasted. On the other hand, smaller size dual pressure column plants generally have a waste nitrogen product which still contains appreciable oxygen, on the order of 1 or 2%, which represents a 5% loss in capacity.

Prior art patents illustrative of the dual pressure column approach to air separation include U.S. Pat. Nos. 4,208,199 and 4,222,756. Argon separation is illustrated in U.S. Pat. Nos. 4,057,407 and 3,751,933. Instead of using a dual pressure column to achieve the pressure difference necessary to allow transfer of heat from the refluxer to the reboiler, it is possible to use a separate compressor to achieve that pressure difference, thereby enabling the use of a more efficient single pressure column. The pressure of the single column should be elevated, e.g. greater that 3 ATA (atmospheres absolute), since high pressure provides more advantage than single pressure per se. The compressor may be externally powered or may be internally powered by work expansion of one of the fluids within the process.

The prior art patents which are closest to this invention and the problems associated with each are as follows. U.S. Pat. Nos. 3,212,276, 3,564,571, 4,088,464, and 4,230,469 all incorporate an externally powered compressor to recycle heat from the refluxer to the reboiler. U.S. Pat. No. 3,212,276 uses a single high pressure column to separate a mixture of light hydrocarbons, and uses a dual compressor closed cycle refrigerant system to transfer or "pump" heat from refluxer to reboiler. U.S. Pat. No. 3,564,571 separates air in a single pressure low pressure (1.5 ATA) column, and uses an externally powered closed cycle helium turbocompressor to pump heat from refluxer to reboiler. The helium refrigerant does not undergo phase change, necessitating use of the less efficient "differential" distillation vice fractional distillation.

U.S. Pat. No. 4,088,464 separates air in a single pressure column operated at 0 to 5 kg/cm$^2$, and uses an externally powered compressor to raise the pressure of overhead nitrogen vapor sufficiently to condense against boiling $O_2$, thereby providing reflux and reboil. This process undesirably cycles a great deal of nitrogen through heat exchangers up to ambient temperature and then back to column temperature, increasing heat and pressure losses.

U.S. Pat. No. 4,230,469 separates a methane-ethylene mixture in a single pressure high pressure column, and uses an external compressor to compress overhead product sufficiently to condense against mid-column liquid (vice reboiler liquid). Entering feed provides the heat for reboil. This process also involves substantial additional heat exchanger losses due to the recycling material. All of the externally powered compressor flowsheets require substantial additional power input at the recycle or heat pump compressor.

U.S. Pat. Nos. 3,535,887 and 3,756,035 both incorporate an internally powered compressor which is used to increase overhead nitrogen pressure sufficiently that it condenses causing reboil and then is used to produce reflux. However, both involve dual or triple pressure columns with a large low pressure section. U.S. Pat. No. 3,535,887 uses supply air to power the expansion turbine which drives the compressor, thereby undesirably reducing the available supply pressure. U.S. Pat. No. 3,756,035 expands only approximately half of the net overhead product to produce work, as the remainder exits the low pressure column at a pressure too low to perform useful work. It also requires additional refrigeration from an external refrigerant medium such as helium. The net result of the internally powered compressor in both the above processes is to allow a pressure reduction in the high pressure part of the dual pressure column to about 2.4 ATA, while still requiring the low pressure (1.3 ATA) part of the column.

Several other prior art distillative separation processes incorporate an internally powered compressor, but not one which is used to pump heat from the refluxer to the reboiler. U.S. Pat. Nos. 3,492,828, 4,061,481, and 4,251,249 have an internally powered compressor which is used to increase the pressure of the discharge overhead gas, and U.S. Pat. Nos. 3,729,944 and 4,040,806 use the internally powered compressor to further compress the supply gas mixture.

DISCLOSURE OF INVENTION

An efficient distillative separation process for noncondensable gas mixtures and others requiring subambient distillation temperatures is provided which avoids the problems in the prior art by conducting distillation in a single pressure distillation column at elevated pressure, partially warming and then work expanding substantially all of the net overhead product from the distillation column, applying at least part of the expansion work to power a heat pump compressor, and using the pressure difference developed by the compressor to cause phase change indirect heat transfer between boiling bottom product and condensing overhead product.

The compression within the cold box does not add any net heat requiring costly refrigeration, because it is counterbalanced by cooling from the work expansion. The compressor discharge gas is advantageously heat exchanged against the expander inlet gas. The fluid compressed by the heat pump compressor can be chosen to suit process conditions: it can be any of the overhead gas, the bottom product gas, the feed gas mixture, or a separate phase change refrigerant in a closed cycle. The column pressure is set high enough that work expansion of the overhead product will provide the amount of heat pumping necessary to supply sufficient reflux and reboil to provide the desired degree of separation, which will generally be at least 3 ATA. Thus, all available compression energy is used for the desired separation, but no extra compression energy is needed to satisfy the minimum pressure requirement of a dual pressure column. The serious disadvantages of a low pressure column are avoided (heat leak, pressure drop, size and cost), whether it is alone or part of a dual pressure column. The additional heat exchange requirements, pressure drops, and power requirements of an externally powered heat pump compressor are also avoided by this process.

BRIEF DESCRIPTION OF THE DRAWINGS

The drawings are schematic flowsheet representations of the internally heat pumped single pressure distillative separation process showing different choices of fluid being heat pumped.

BEST MODE FOR CARRYING OUT THE INVENTION

Figure 1:
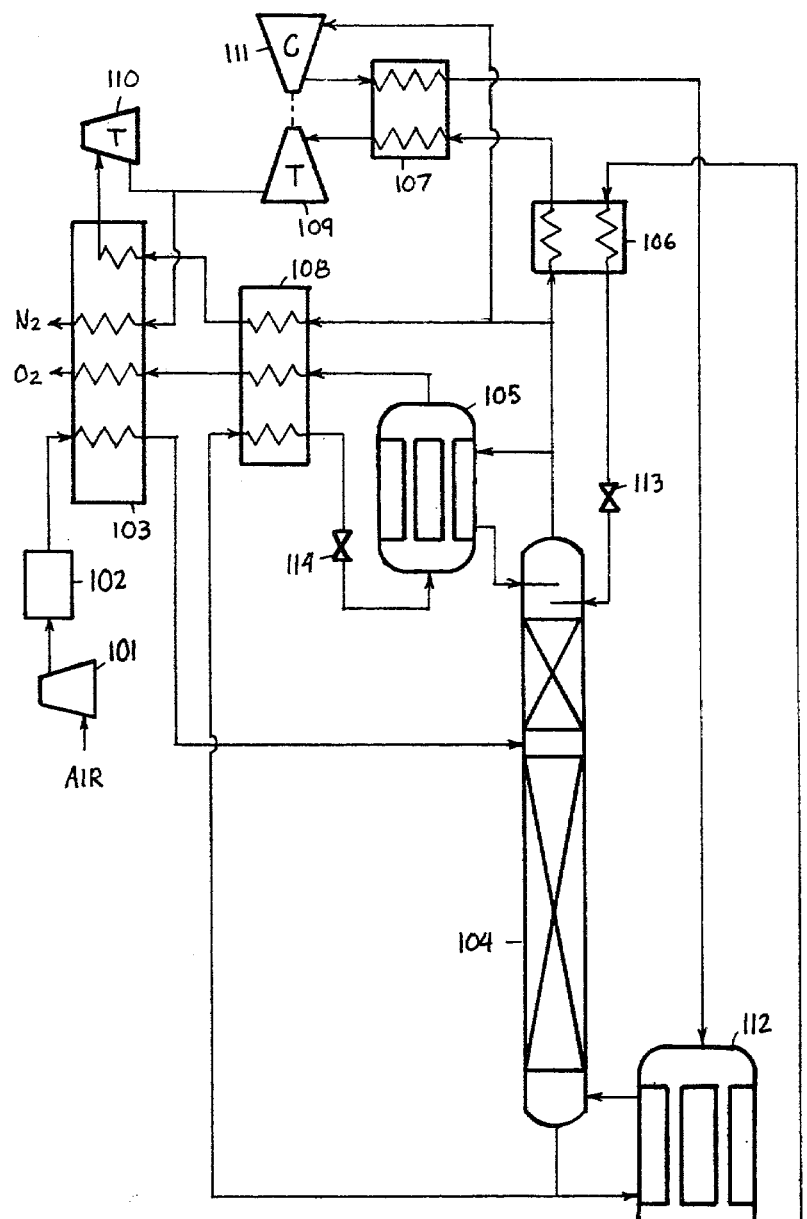
FIG. 1 is the embodiment in which overhead product is heat pumped, and is suggested as most representative.

Referring to FIG. 1, the supply or feed gas mixture is compressed to the desired elevated pressure in compressor 101 (if not already available at that pressure), cooled and purified as necessary in cooler/purifier 102, and cooled to approximately the condensation temperature or dewpoint in heat exchanger 103 countercurrently to exiting separated fluids. It is then introduced to a midpoint location of fractional distillation column 104 appropriate to the feed composition and the desired separation. The ascending vapor and descending liquid which undergo contact on the multiple countercurrent stages of the column separate the feed into a more volatile overhead vapor and a less volatile bottom liquid.

Part of the overhead vapor goes to reflux condenser 105 and compressor 106. Those parts are eventually liquefied and returned to the column as reflux. The remaining overhead vapor, which is the net overhead product (i.e. having a flow rate which at steady state is equivalent to the flow rate of overhead product entering the column in the feed) is routed through warming heat exchangers 106, 107, 108 and 103 to expansion turbines 109 and 110. The warming heat exchangers heat the expander inlet gas sufficiently that the expander outlet gas does not fall to a temperature such that excessive condensation occurs (preferably slightly above condensation temperature), and to increase the expansion work obtained over that which would be obtained in the absence of warming.

The work developed by expander 109 powers compressor 111 which raises the pressure of overhead vapor sufficiently that it will condense against boiling bottom product in reboiler 112. The compressed overhead vapor is partially cooled in heat exchanger 107 and then introduced into reboiler 112, causing it to condense and generating reboil vapor for the bottom of the column. Condensed overhead product is then routed through heat exchanger 106 which subcools it to minimize flashing upon pressure reduction, then reduced to column pressure in means for pressure reduction 113 and refluxed to the top of the column. The net liquid bottom product is similarly subcooled in heat exchanger 108, reduced in pressure in means for pressure reduction 114, and introduced into refluxer 105, where it boils and causes overhead vapor to condense to provide additional column reflux. Gaseous overhead product from refluxer 105 is used to cool liquid bottoms in 108 and entering feed gas in 103. Net overhead product exhaust from expanders 109 and 110 is also used to cool entering feed in 103. Power developed in expander 110 is withdrawn from the cold box thereby providing the bulk of the refrigeration required by the process.

Figure 2:
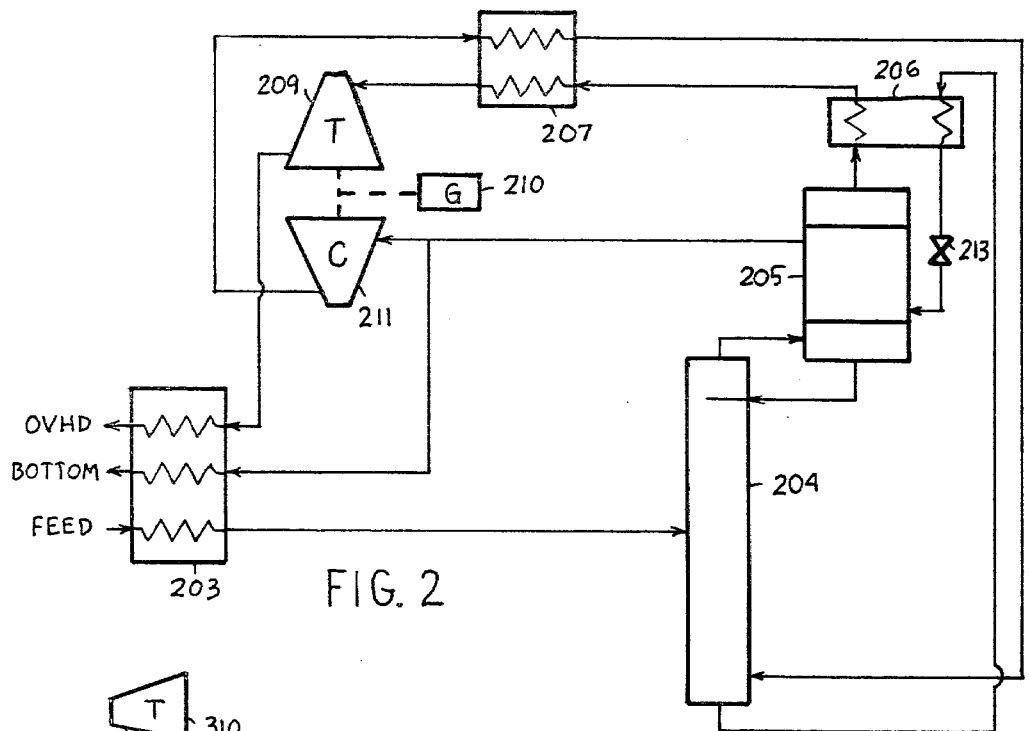
FIG. 2 is the embodiment in which bottom product is heat pumped.

In FIG. 2, elevated pressure feed gas is similarly cooled in heat exchanger 203 and introduced into column 204. The vaporous overhead product is directed into refluxer 205, wherein part is condensed and returned to the column as reflux, and the remainder, which is the net overhead product, is partially warmed in heat exchangers 206 and 207 and then expanded through turbine 209. Part of the work developed by turbine 209 goes to loading device 210 such as an electrical generator, which is used to extract work from the cold box and thereby provide the necessary process refrigeration. The remaining expansion work from turbine 209 is used to drive heat pump compressor 211. The compressor 211 raises the pressure of bottom product gas which has evaporated in refluxer 205 up to the column pressure, and then it is partially cooled in heat exchanger 207 and returned to the bottom of the column as reboil vapor. The bottom product liquid is routed through subcooler 206 and means for pressure reduction 213 into the refluxer, at a pressure low enough that boiling bottom product will absorb heat from condensing overhead product at column pressure. The net gaseous bottom product from refluxer 205 is withdrawn from the cold box by heat exchange against entering feed in 203, and the remaining bottom product evaporated in 205 is routed to compressor 211 to be compressed back to column pressure. The net gaseous overhead from turbine 209 is withdrawn from the cold box of cold region via heat exchange against incoming feed in 203.

Figure 3:
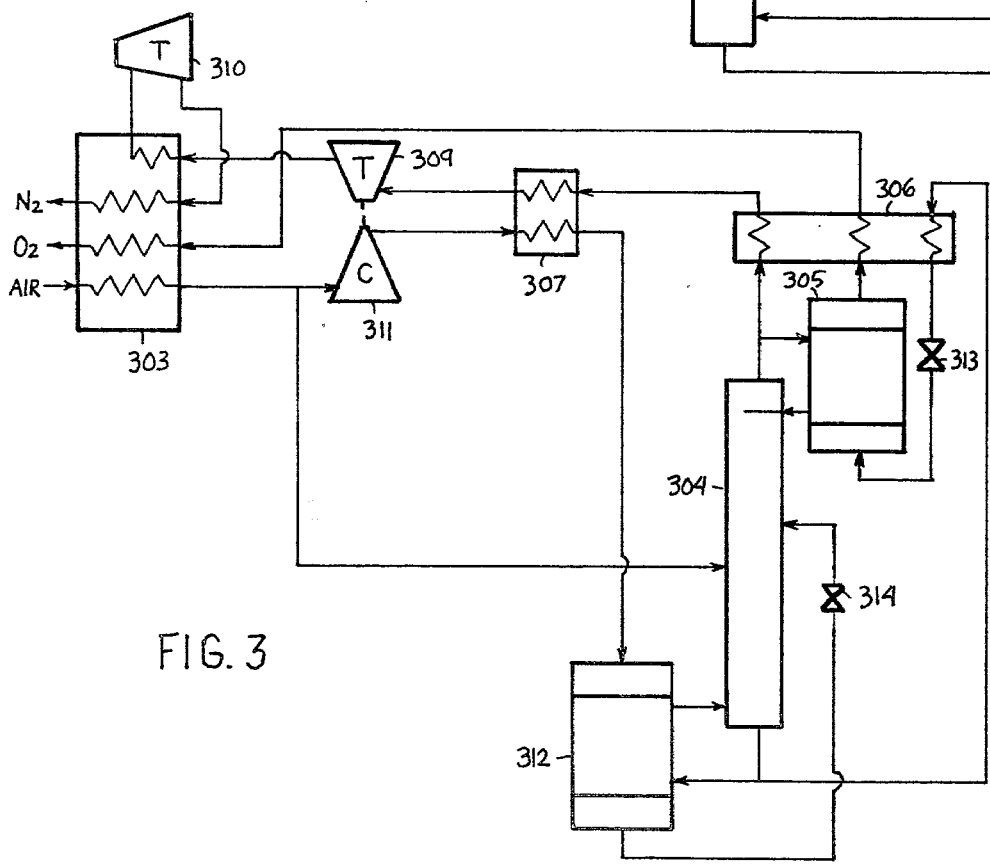
FIG. 3 shows feed gas being heat pumped.

In FIG. 3, elevated pressure feed gas is similarly cooled in heat exchanger 303. However, only part of the feed is introduced directly into column 304, with the remainder being compressed by compressor 311 to a pressure sufficiently ghigh that the feed gas will condense against boiling bottom product in reboiler 312. Part of the gaseous overhead product from column 304 is routed to refluxer 305, where it is condensed and refluxed to the column top. The remainder, which is the net overhead product, is superheated in heat exchangers 306 and 307 and partially work expanded in turbine 309, thereby developing the power necessary to drive compressor 311. The cooled partially expanded net overhead product is further superheated in 303 and then work expanded to exhaust pressure in expander 310, from whence it is withdrawn from the cold area via heat exchange against entering feed in 303.

Condensing feed material in reboiler 312 causes evaporation of liquid bottom product and hence provides reboil to the bottom of column 304. The condensed feed is reduced to column pressure in means for pressure reduction 314 (after optional subcooling), and then introduced to column 304 as impure reflux at a location above the feed location but below the top where pure reflux is introduced.

In comparing the three figures, the primary difference is which material is being compressed by the heat pump compressor. The term heat pump has the conventional connotation that the material being compressed undergoes liquefaction at the compressor discharge pressure and evaporation at the compressor suction temperature, thereby pumping heat up a temperature gradient. In addition to the three process fluids shown being heat pumped in FIGS. 1 through 3, it is possible to have a separate fluid in a closed cycle heat pump. The fluid chosen should be one that liquefies and evaporates at reasonable pressures at the desired process temperature, and which is non reactive with overhead or bottoms product in case of leaks. For example in the process of air separation argon is one preferable choice of closed cycle internally heat pumped fluid.

A second difference between the three figures is the manner in which refrigeration is supplied. In all three flowsheets the separated gas exits at a lower pressure than the mixture enters, and, hence, there is some Joule-Thomson cooling. This amount is insufficient, however, to compensate for normal heat leaks and provide the necessary thermal driving head—hence, additional refrigeration is required. One of the commonest and most desirable means of doing this is by work expanding some pressurized gas stream and withdrawing the work from the cold region. The three figures illustrate three variations of this technique, using expansion of overhead product. In FIG. 1, a separate refrigeration expander is provided in parallel with the heat pump expander. In FIG. 2, a single expander provides both functions. In FIG. 3, a separate refrigeration expander is provided in series with the heat pump expander. Typically, the power rating of the refrigeration expander will only be 10 to 30% of the power rating of the heat pump expander. Other locations for the refrigeration expander are also possible. It can expand the gaseous bottom product, or it can expand part or all of the incoming feed gas. It is emphasized that the choice of refrigeration technique is independent of the choice of heat pump fluid, i.e., any of the three internal heat pumping configurations shown in FIGS. 1–3 can use any of the three refrigeration techniques shown in those figures or any other known technique.

Heat exchanger X03 (where X signifies the figure number) is a means for reducing the feed temperature to approximately the column temperature. Various means are known in the art for accomplishing this, e.g., regenerative heat exchangers or reversing heat exchangers, which may also further purify the incoming feed gas, and any of these can be used. Heat exchangers X06 and X07 perform the desirable functions of superheating the supply to the expander, desuperheating the compressor discharge, and subcooling liquid prior to pressure reduction. The particular configuration of heat exchangers used to accomplish these functions is not important, but the functions are as they materially enhance process efficiency.

The means for pressure reduction X13 can be a valve, orifice, hydraulic turbine, or other known apparatus. The reboiler and reflux condensor X05 and X12 are represented as conventional shell and tube heat exchangers external to the column, however, any known type can be used, e.g., plate fin, enhanced tube, or thermosiphon types, and they may be physically located inside the column.

Typical gas mixtures which can be separated efficiently by this process include the following: air, $N_2$—$CH_4$ (or natural gas), and ethane-ethylene. In the case of air, the following points would be considered in determining which fluid to internally heat pump. If the bottoms fluid (oxygen) is compressed, FIG. 2, there is a concern over safety, and the compressor requirements are very stringent. For example, gas lubricated bearings would be desired over oil lubrication. However, column pressure can vary from 3 ATA to well over 16 ATA. With nitrogen being heat pumped (FIG. 1), no extra compressor precautions are necessary. The minimum column pressure is still approximately 3 ATA, which is necessary to make sufficient power available in the overhead product to produce the necessary heat pumping and refrigeration. However, the maximum column pressure is approximately 7 ATA, since the nitrogen pressure necessary to condense against 7 ATA boiling oxygen is approximately 20 ATA, and the ΔH of evaporation of nitrogen decreases rapidly beyond that point as its critical point is approached. Also, with nitrogen being heat pumped, in order to achieve a high efficiency for producing gaseous low pressure products it is necessary to add the liquid oxygen cooled refluxer 105, making the flowsheet somewhat more complex than that of FIG. 2. On the other hand, if either liquid oxygen or pressurized gaseous oxygen is a desired product, then LOX refluxer 105 would not be used, and the column would be operated at a correspondingly higher pressure such that the heat pump can supply the reflux otherwise supplied by 105.

In comparing FIG. 1 to FIG. 3 for air separation, when the feed air is internally heat pumped (FIG. 3), there will be relatively more reboil and less reflux than when $N_2$ is heat pumped. Hence, the oxygen product will tend to be purer and $N_2$ less pure (for same number of stages or plates in column). The pressure ratio required from the compressor XII is lowest for air, higher for $N_2$, and highest for $O_2$ being heat pumped, varying from 3 to 4.5, depending on conditions. If closed cycle Ar is heat pumped, an even higher compression ratio is necessary, e.g., 4.6, due to the second phase change heat exchange ΔT it requires.

For all three flowsheets when the column pressure is decreased below approximately 3.8 ATA the oxygen product will be produced at a pressure below ambient, requiring a vacuum compressor. Also, all three flowsheets when used for air separation should have standard liquid oxygen safety devices such as silica gel adsorbers (gas or liquid phase). These flowsheets produce all of the overhead as a pure product, i.e., do not have the waste $N_2$ stream associated with dual pressure columns. Hence, it may be desirable to use molecular sieve rather than reversing heat exchangers for $H_2O$ and $CO_2$ removal, to avoid the necessity for contaminating any of the separated gas. Either the oxygen or the nitrogen or both can be the useful end product of the process, and an argon recovery section can also be added at the appropriate midpoint of the column to recover that gas by known techniques.

Example: Without limiting the scope of the disclosure, this example illustrates the use of the FIG. 1 apparatus to separate a feed mixture consisting of 790 mol/s $N_2$ and 210 mol/s $O_2$ (i.e., having a composition similar to air). The feed is compressed to 5.5 ATA, cooled to 102 K., and introduced into the column at 5.15 ATA, wherein the bottom of the column is at 5.3 ATA and the top at 5.0 ATA. $N_2$ condensing temperature at the column top is 94 K., and $O_2$ boiling temperature at column bottom is 110 K. 210 mol/s liquid $O_2$ bottom product is subcooled to 96 K. and then reduced in pressure to 1.25 ATA at which pressure it boils at 92 K. absorbing heat from condensing $N_2$ at 94 K. in refluxer 105. 280 mol/s of liquid $N_2$ reflux result thereby. 120 mol/s of gaseous $N_2$ is warmed to 130 K. in heat exchangers 108 and 103, then expanded to 1.2 ATA and 91 K. in expander 110. 670 mol/s gaseous $N_2$ is warmed to 136 K. in heat exchangers 106 and 107, then expanded to 1.2 ATA and 96 K. in expander 109. 595 mol/s $N_2$ at 94 K. is compressed from 5 ATA to 16.2 ATA and 140 K. in compressor 111. Then cooled to 114 K. in 107 and introduced into reboiler 112, where it condenses at 112 K. and evaporates 365 mol/s $O_2$ at 110 K. for reboil. The 595 mol/s liquid $N_2$ is then subcooled to 97 K. and added to the column reflux. Thus, a high purity and high recovery separation is accomplished using a feed pressure of only 5.5 ATA, which is significantly lower than the 6.3 ATA typical minimum pressure for a dual pressure column process yielding comparable purity and recovery. The flow rates cited above, which are only approximate and not to be considered limiting, reflect the use of a high efficiency turbocompressor of the gas bearing type, with turbine and compressor efficiencies of 90% and 82% respectively.

The $N_2$ compressed by the heat pump compressor condenses at 112 K., i.e., at a process temperature. The compressor suction gas is at condensation and the turbine discharge gas is 17 K. above condensation temperature; those temperatures should generally be within 25 K. of condensation in order to ensure reasonable process efficiency, which also applies to the feed gas temperature. The pressure ratio necessary to accomplish the desired phase change heat transfer varies with the relative volatility and purity of the separated constituents, the heat exchanger temperature differential, and the column ΔP, and for air separation is in the range 2–5. In FIG. 2 the proportion of the feed air supplied to the compressor may vary from 20 to 80%, preferably 50%.

I claim:
1. In a process for the subambient distillation of gases, the improvement comprising:
   (a) providing a single pressure subambient temperature distillation column;
   (b) providing a heat pump compressor and a turbine providing the sole power thereto;
   (c) feeding at least a portion of the overhead of said column to said turbine;
   (d) compressing a stream obtained from said column in said compressor sufficient to condense against boiling column bottom product, so as to provide substantially all the reboiler energy and reflux requirements of said column by indirect exchange of latent heat;
   (e) returning said stream to said column after said exchange of latent heat.
2. The process according to claim 1 wherein the compressor discharge gas is cooled by indirect heat exchange against the overhead product supplied to the means for work expansion such as a turbine.
3. The process according to claim 2 wherein the gas being compressed is at least part of the feed gas mixture.
4. The process according to claim 2 wherein the compressor inlet gas and the turbine discharge gas are within 25 K. of their respective condensation temperatures.
5. The process according to claim 4 wherein nitrogen overhead product from the column is compressed and then is condensed against boiling oxygen bottom product, and comprising the additional step of depressurizing the net liquid bottom product so as to absorb boiling heat from condensing overhead product at column pressure, and wherein the elevated pressure is in the range of 3 to 7 ATA.
6. The process according to claim 2 wherein the gas being compressed is overhead product from the column.
7. The process according to claim 1 wherein the gas being compressed is gaseous bottom product.
8. The process according to claim 1 wherein part of the expansion work obtained by work expanding net overhead product is withdrawn so as to provide refrigeration.

9. The process according to claim 1 wherein the gas mixture is selected from the list consisting of $N_2$ plus $CH_4$, $CH_4$ plus $C_2H_4$, and $C_2H_4$ plus $C_2H_6$.

10. The process according to claim 1 wherein the gas mixture is air or dried and purified air.

11. The process according to claim 10 wherein depressurized bottom product gaseous oxygen is compressed to column pressure after absorbing boiling heat at low pressure from condensing nitrogen at column pressure, and wherein the column pressure is in the range 3 to 16 ATA.

12. The process according to claim 10 wherein part of the feed air is compressed to 2 to 5 times column pressure and condenses against reboiling oxygen and then is supplied to the column as impure reflux.

13. The process according to claim 1 wherein air is separated into at least nitrogen and oxygen comprising (a) supplying purified and cooled air at an elevated pressure in the range of 3 to 7 ATA to a single pressure distillation column;
(b) partially warming and work expanding the net nitrogen overhead product from the column;
(c) applying at least part of the expansion work to compress nitrogen overhead product to a pressure 2 to 5 times the column pressure;
(d) condensing compressed nitrogen against boiling oxygen at column pressure, thereby supplying reboil; and
(e) supplying the condensed nitrogen as column reflux.

14. The process according to claim 13 comprising the additional steps of
(a) depressurizing the net liquid bottom product oxygen to 2 to 5 times less than column pressure;
(b) transferring heat from boiling depressurized oxygen to condensing column overhead, whereby reflux is provided.

* * * * *